(12) United States Patent
Tsukahara et al.

(10) Patent No.: US 7,948,661 B2
(45) Date of Patent: May 24, 2011

(54) IMAGE READING APPARATUS AND IMAGE FORMING APPARATUS INCLUDING THE IMAGE READING APPARATUS

(75) Inventors: Hajime Tsukahara, Yokohama (JP); Tohru Kanno, Kawasaki (JP)

(73) Assignee: Ricoh Company Limited, Tokyo (JP)

( * ) Notice: Subject to any disclaimer, the term of this patent is extended or adjusted under 35 U.S.C. 154(b) by 874 days.

(21) Appl. No.: 11/932,168

(22) Filed: Oct. 31, 2007

(65) Prior Publication Data
US 2008/0106748 A1 May 8, 2008

(30) Foreign Application Priority Data

Nov. 2, 2006 (JP) ................... 2006-299145

(51) Int. Cl.
*H04N 1/04* (2006.01)
*H04N 1/40* (2006.01)
(52) U.S. Cl. .......... 358/445; 358/1.1; 358/505; 358/474
(58) Field of Classification Search .................. 358/445, 358/1.1, 505, 474, 483
See application file for complete search history.

(56) References Cited

U.S. PATENT DOCUMENTS

| | | | |
|---|---|---|---|
| 5,408,113 A | 4/1995 | Kanno et al. | |
| 6,198,349 B1 | 3/2001 | Kanno et al. | |
| 6,426,804 B1 * | 7/2002 | Kanno et al. | 358/445 |
| 2004/0047007 A1 | 3/2004 | Kanno et al. | |
| 2007/0216915 A1 | 9/2007 | Tsukahara | |

FOREIGN PATENT DOCUMENTS

| | | |
|---|---|---|
| JP | 6-14188 | 1/1994 |
| JP | 2005-94566 | 4/2005 |
| JP | 3828296 | 7/2006 |

OTHER PUBLICATIONS

Office Action issued Oct. 26, 2010 in JP Application No. 2006-299145.

\* cited by examiner

*Primary Examiner* — Houshang Safaipour
(74) *Attorney, Agent, or Firm* — Oblon, Spivak, McClelland, Maier & Neustadt, L.L.P.

(57) ABSTRACT

An image reading apparatus and an image forming apparatus including the image reading apparatus. The image reading apparatus includes a photoelectric converter to convert incident light into an analog image signal, a drive unit to drive the photoelectric converter by a frequency modulated clock signal, an overlapping circuit to overlap an anti-phase analog signal to the analog image signal fluctuating according to the frequency modulated clock signal with a same amount of fluctuation as that of the analog image signal, and an analog digital converter to convert the overlapped analog image signal into a digital output.

17 Claims, 19 Drawing Sheets

IMAGE READING APPARATUS AND IMAGE FORMING APPARATUS INCLUDING THE IMAGE READING APPARATUS

CROSS-REFERENCE TO RELATED APPLICATION

This patent specification is based on and claims priority from Japanese Patent Application No. 2006-299145 filed on Nov. 2, 2006 in the Japan Patent Office, the entire contents of which are incorporated by reference herein.

BACKGROUND

1. Field of the Invention

The present invention relates to an image reading apparatus and an image forming apparatus including the image reading apparatus.

2. Description of the Related Art

With regard to image reading apparatuses, picture element density and operating speed have been increased to cope with an increasing demand for high-quality images and high-speed operation.

Described below is one example of signal processing, from image reading by a photoelectric converter to conversion to a digital image signal, in a typical digital copier.

FIG. 1 is a block diagram illustrating an example of typical signal processing circuitry for reading signals in a typical digital copier. In this example, a clock signal from an oscillator 101 is frequency modulated by a Spread Spectrum Clock Generator (SSCG) circuit 102 and multiplied by a Phase Locked Loop (PLL) circuit 103 to produce a CCD drive signal and a signal processing IC drive signal by a timing generator 104.

The frequency modulated clock signal from the timing generator 104 drives a Charge-Coupled Device (CCD) 105, which is a photoelectric converter that converts light reflected from an original into an electrical signal. The CCD 105 outputs an analog image signal to a signal processing IC 107 via an emitter follower (EF) circuit 106. The signal processing IC 107 includes a clamping (CLMP) circuit 108, a sample-hold (SH) circuit 109, a programmable gain amplifier (PGA) 110, and an AD converter (ADC) 111.

After the analog image signal is AC coupled, the clamping circuit 108 clamps the analog image signal at an internal reference potential of the signal processing IC 107. The sample-hold circuit 109 samples the analog image signal by using a sample pulse, which is one of the signal processing IC drive signals, and maintains the level of the analog image signal to produce a continuous analog image signal. This continuous analog image signal is amplified by the programmable gain amplifier 110 and converted into digital data by the AD converter 111.

As the picture element density or image reading speed increases, the frequency of a clock signal that is not frequency modulated increases to drive the CCD 105 that reads an image and the signal processing IC 107 that processes the analog image signal output from the CCD 105. This also increases undesired electromagnetic radiation.

To avoid this problem, a unit for modulating the frequency is placed after the oscillator generating the clock frequency, or the oscillator is provided with a spread spectrum function, thereby reducing the undesired radiation strength at the frequency peak. This technology is referred to as SSCG.

FIG. 2 is a diagram illustrating an example in which SSCG is applied. The horizontal axis represents frequency and the vertical axis represents electric field strength. The SSCG circuit 102 diffuses clock frequencies having spectral characteristics of S1 to clock frequencies having spectral characteristics of S2 by frequency modulation and spectrum spreading. Accordingly, it is possible to reduce the electric field strength by an amount P and thus reduce undesired radiation, compared with the clock frequencies having the spectral characteristics of S1.

However, when a frequency modulated clock signal is used as an analog drive clock signal in the above-described example, the output offset voltage of the CCD 105 fluctuates. As a result, a problem occurs in that since the image signal level periodically fluctuates between high and low in one line when scanning the line, the levels are not the same even when the read density levels are the same. A CCD drive signal is typically generated from a highly accurate reference clock signal with an oscillation accuracy of, for example, 50 PPM, 100 PPM, etc. When the clock signal is frequency modulated to deal with undesired radiation, the frequency fluctuates with time as illustrated in the diagram in the lower part of FIG. 3, where the horizontal axis represents time and the vertical axis represents frequency. That is, the frequency smoothly fluctuates within a range of, for example, ±0.5%, ±1.0%, etc. relative to a reference frequency. Typically, this frequency modulation cycle fluctuates regularly. That is, as illustrated in the diagram in the lower part of FIG. 3, the modulation cycle is repeated such that the frequency is modulated to a short clock cycle, i.e., a high frequency (on the positive side) relative to the reference frequency, and then to a long clock cycle, i.e., a low frequency (on the negative side) with the same characteristic curve as that of the high frequency and returns to the reference frequency. The SSCG circuit 102 may randomly change the modulation cycle. Accordingly, the phase matches the reference frequency every half-cycle of the modulation.

The diagram in the upper part of FIG. 3 illustrates the fluctuation in the image level according to the modulation cycle, where the horizontal axis represents time and the vertical axis represents image level. The image level fluctuates in synchronization with the modulation cycle. When this fluctuation is repeated during scanning lines, the image level difference results in fine streaks in a read image, which are perceived as horizontal streaks. FIG. 4 is a schematic diagram illustrating a resulting image of first to sixth lines, where the horizontal axis represents main scanning direction and the vertical axis represents sub-scanning direction. This problem has not yet been resolved.

SUMMARY

This patent specification describes a novel image reading apparatus that includes a photoelectric converter to convert incident light into an analog image signal, a drive unit to drive the photoelectric converter by a frequency modulated clock signal, an overlapping circuit to overlap an anti-phase analog signal to the analog image signal fluctuating according to the frequency modulated clock signal with a same amount of fluctuation as that of the analog image signal, and an analog digital converter to convert the overlapped analog image signal into a digital output.

This patent specification further describes a novel image forming apparatus that includes the image reading apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
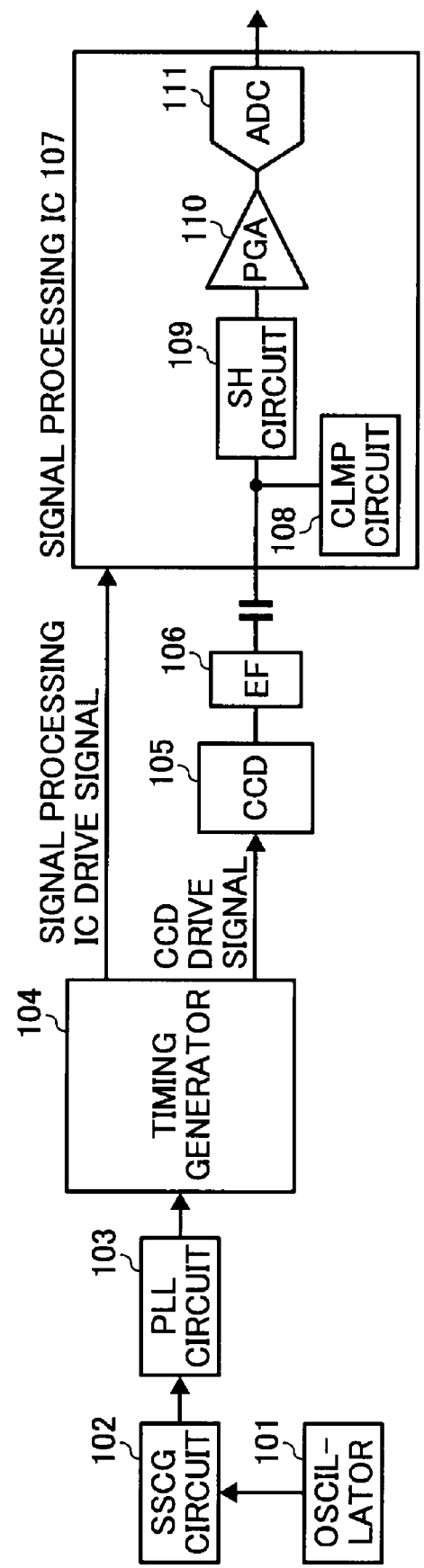
FIG. 1 is a block diagram illustrating an example of typical signal processing circuitry for reading signals in a typical digital copier.
Figure 2:
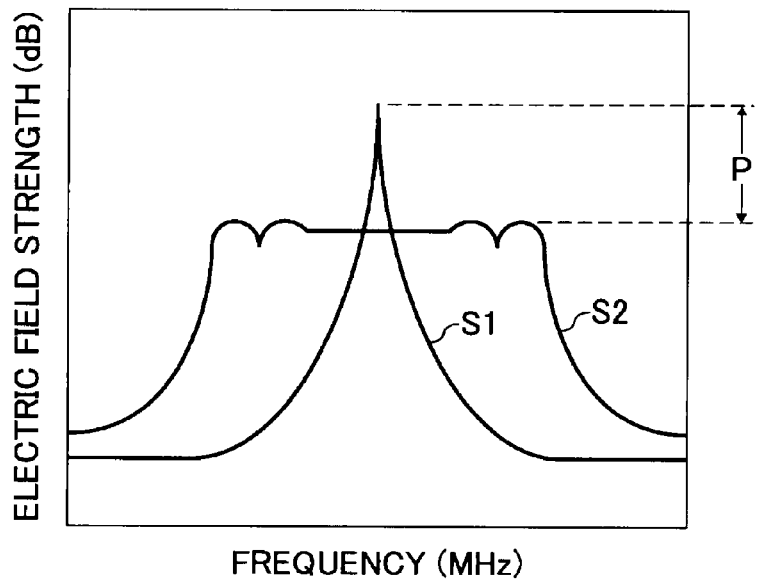
FIG. 2 is a diagram illustrating an example in which SSCG is applied.
Figure 3:
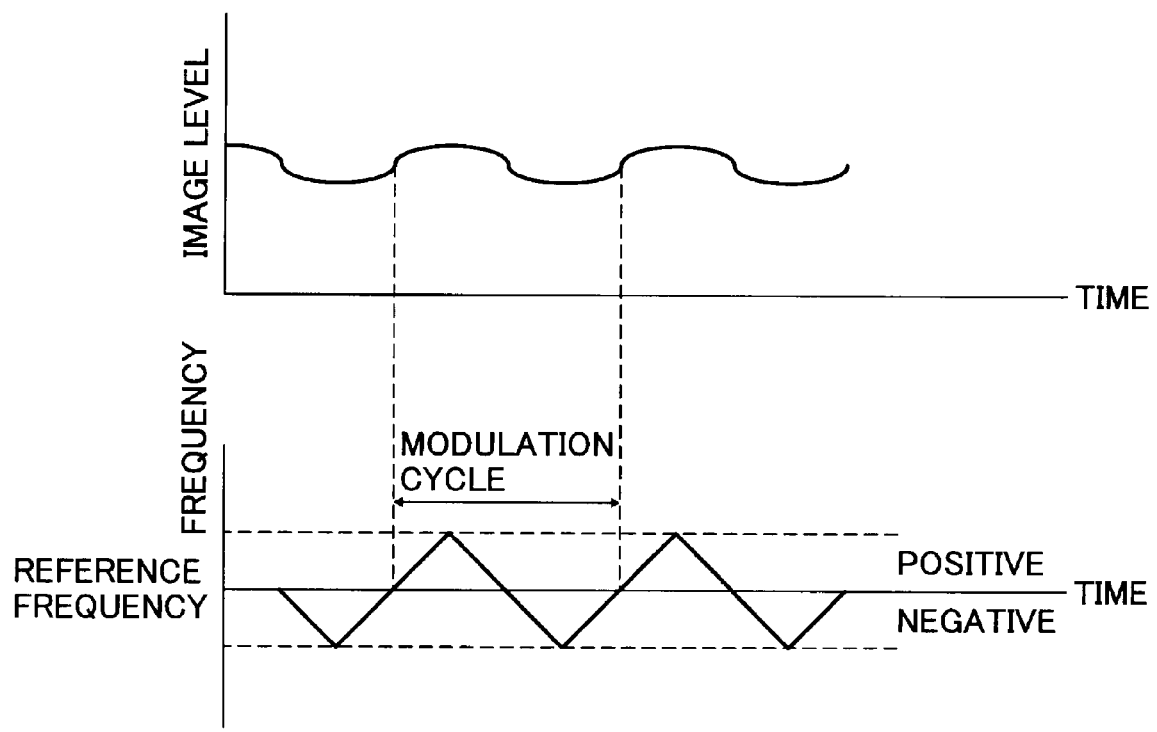
FIG. 3 is a diagram illustrating a frequency and an image level with respect to time when the frequency is modulated to deal with undesired radiation.
Figure 4:
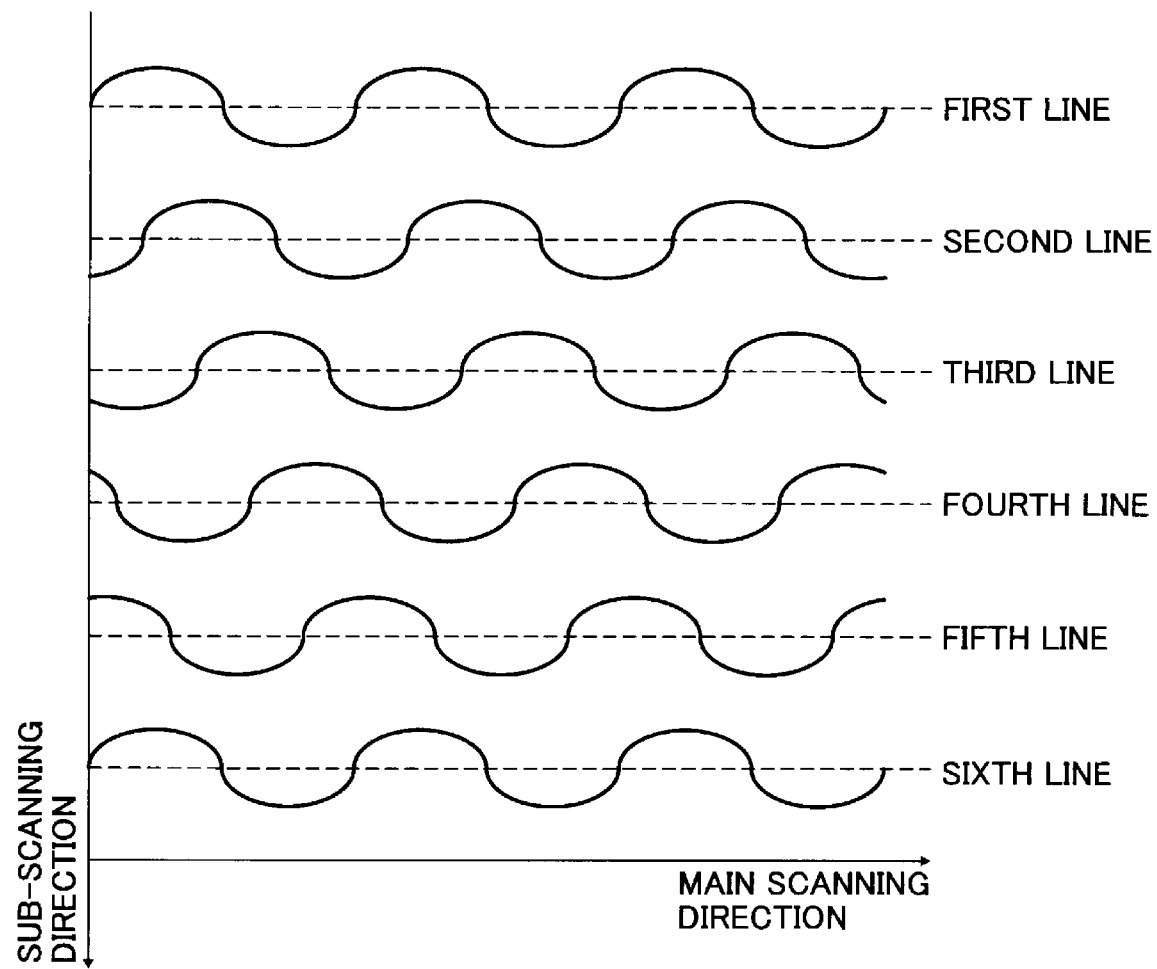
FIG. 4 is a schematic diagram illustrating an output image example resulting from a fluctuation component in image signals.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 7:
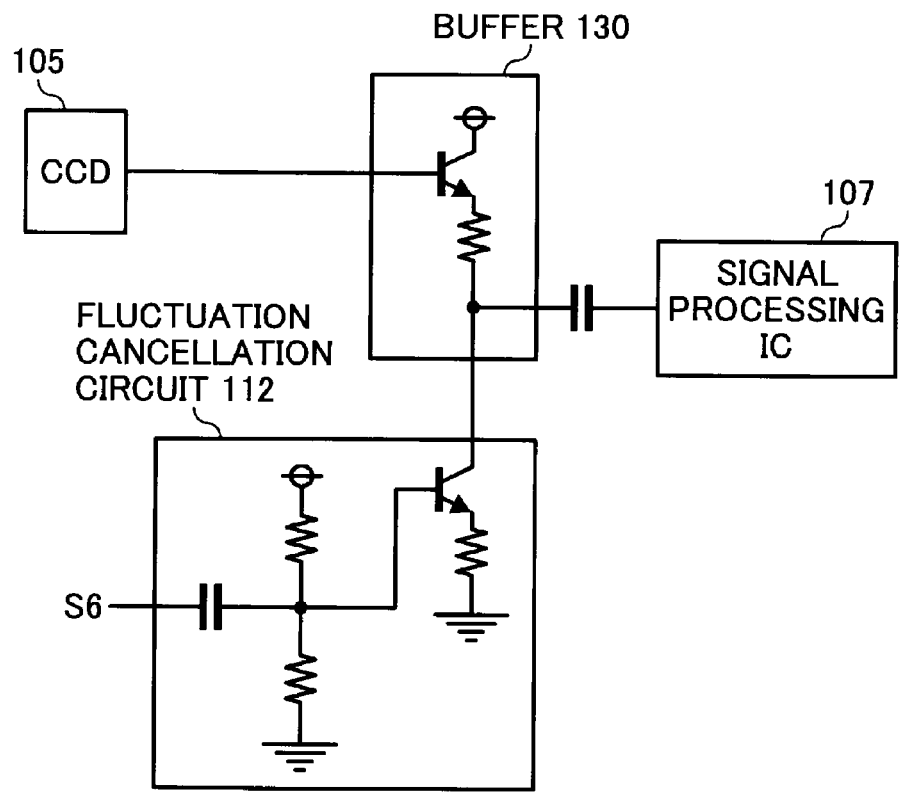
FIG. 7 is a block diagram illustrating an example circuit configuration for signal processing according to a second embodiment of the present invention.

Referring now to the drawings, wherein like reference numerals designate identical or corresponding parts throughout the several views thereof, particularly to FIG. 7, image reading apparatuses according to exemplary embodiments of the present invention are described.

Figure 5:
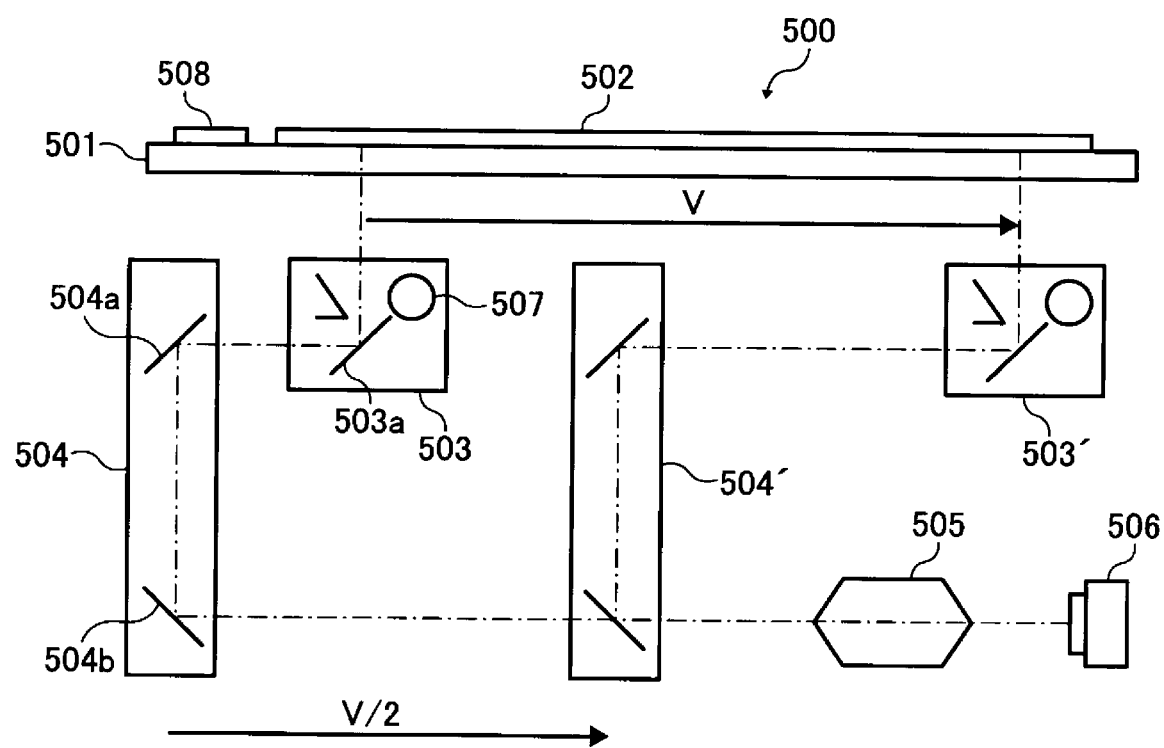
FIG. 5 is a diagram illustrating a schematic configuration of an image reading apparatus according to an embodiment of the present invention.

FIG. 5 is a diagram illustrating a schematic configuration of an image reading apparatus 500 according to an embodiment of the present invention. A signal processing circuit for read signals employed in the image reading apparatus 500 is similar to the signal processing circuit illustrated in FIG. 1. Specifically, the signal processing circuit includes an oscillator 101, an SSCG circuit 102, a PLL circuit 103, a timing generator 104, a CCD 105, an emitter follower circuit 106, and a signal processing IC 107. The clock signal from the oscillator 101 is frequency modulated by the SSCG circuit 102 and multiplied by the PLL circuit 103 to produce a CCD drive signal and a signal processing IC drive signal by the timing generator 104. The frequency modulated clock signal from the timing generator 104 drives the CCD 105, which outputs an analog image signal to the signal processing IC 107 via the emitter follower circuit 106. The signal processing IC 107 includes a clamping (CLMP) circuit 108, a sample-hold (SH) circuit 109, a programmable gain amplifier (PGA) 110, and an AD converter (ADC) 111. The signal processing circuit performs the operation described above with reference to FIG. 1.

Referring to FIG. 5, the image reading apparatus 500 includes a contact glass 501, a first traveling body 503, a second traveling body 504, an imaging lens 505, and a CCD 506. The first traveling body 503 includes a first mirror 503a and a light source 507. The second traveling body 504 includes a second mirror 504a and a third mirror 504b. A reference whiteboard 508 is provided on the contact glass 501 at a position corresponding to a position where the first traveling body 503 starts scanning.

In the image reading apparatus 500 having the above-described configuration, an original 502 on the contact glass 501 is irradiated with an irradiation system provided below the contact glass 501. The irradiation system includes the light source 507. The light reflected from the original 502 is deflected by the first mirror 503a mounted on the first traveling body 503 and by the second mirror 504a and the third mirror 504b mounted on the second traveling body 504. When the deflected light reaches the imaging lens 505, the imaging lens 505 focuses the light onto the surface of the CCD 506. To read the original 502 in the longitudinal direction, the first traveling body 503 moves to a position 503' at a speed of V, and simultaneously, the second traveling body 504 moves to a position 504' at a speed of V/2, that is, at half the speed of the first traveling body 503 in conjunction with the first traveling body 503. In other words, the first traveling body 503 and the second traveling body 504 travel in a sub-scanning direction with a speed ratio of 2 to 1 to maintain a constant optical path length.

The following describes embodiments according to the present invention based on the configuration of the image reading apparatus 500 of FIG. 5 and the signal processing circuit of FIG. 1.

Figure 6:
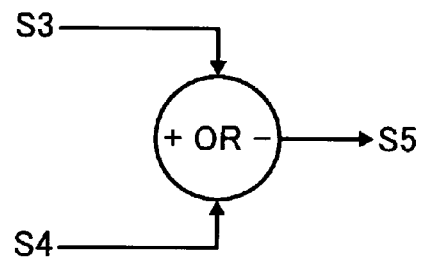
FIG. 6 is a diagram illustrating a structure of canceling fluctuation according to clock frequency modulation cycle according to a first embodiment of the present invention.

FIG. 6 is a diagram illustrating a structure for canceling the fluctuation according to the clock frequency modulation cycle according to a first embodiment of the present invention. In the first embodiment, the CCD 105 is driven by the frequency modulated clock signal and the image signal is overlapped to a signal corresponding to the fluctuation in the clock frequency. The fluctuation according to the clock frequency modulation cycle is cancelled by analog addition or subtraction of two signals: an image signal (analog image signal) S3 that fluctuates according to the clock frequency modulation cycle and a signal corresponding to the fluctuation in the clock frequency (modulated analog signal) S4, which is an anti-phase signal with the same amount of fluctuation as that of the image signal S3. The resulting signal is output as a signal S5.

According to the first embodiment, the analog image signal that fluctuates according to the clock frequency modulation cycle is overlapped to the signal corresponding to the fluctuation in the clock frequency, which is the anti-phase analog signal with the same amount of fluctuation as that of the image signal. Therefore, the fluctuation component in the image signal is cancelled.

FIG. 7 is a block diagram illustrating an example circuit configuration for signal processing according to a second embodiment of the present invention. In the second embodiment, the level of the output signal of the CCD is shifted by an amount corresponding to the fluctuation in the clock frequency by a level shift circuit.

In FIG. 7, a buffer 130 is placed after the CCD 105. A modulated signal S6 is input to a fluctuation cancellation circuit 112 and the output thereof is input to the buffer 130. The output of the buffer 130 is input to the signal processing IC 107. The output signal of the CCD 105 passes through the buffer 130, is AC coupled to eliminate a DC component therefrom, and is processed and converted into digital data by the signal processing IC 107.

The fluctuation cancellation circuit 112 provides a level shift function. The modulated signal S6, which is an analog signal corresponding to the fluctuation in the clock frequency, is AC coupled to eliminate a DC component therefrom, overlapped to a bias voltage, and input to the buffer 130. Accordingly, it is possible to change a bias current of the buffer 130 to an anti-phase analog signal with the same amount of fluctuation as that of the image signal and cancel the fluctuation component in the analog image signal.

According to the second embodiment, when the analog image signal is overlapped to the anti-phase analog signal with the same amount of fluctuation as that of the image signal, the level of the output signal of the CCD is shifted by the same amount as the fluctuation amount of the image signal. Therefore, the fluctuation component in the image signal is cancelled.

Figure 8:
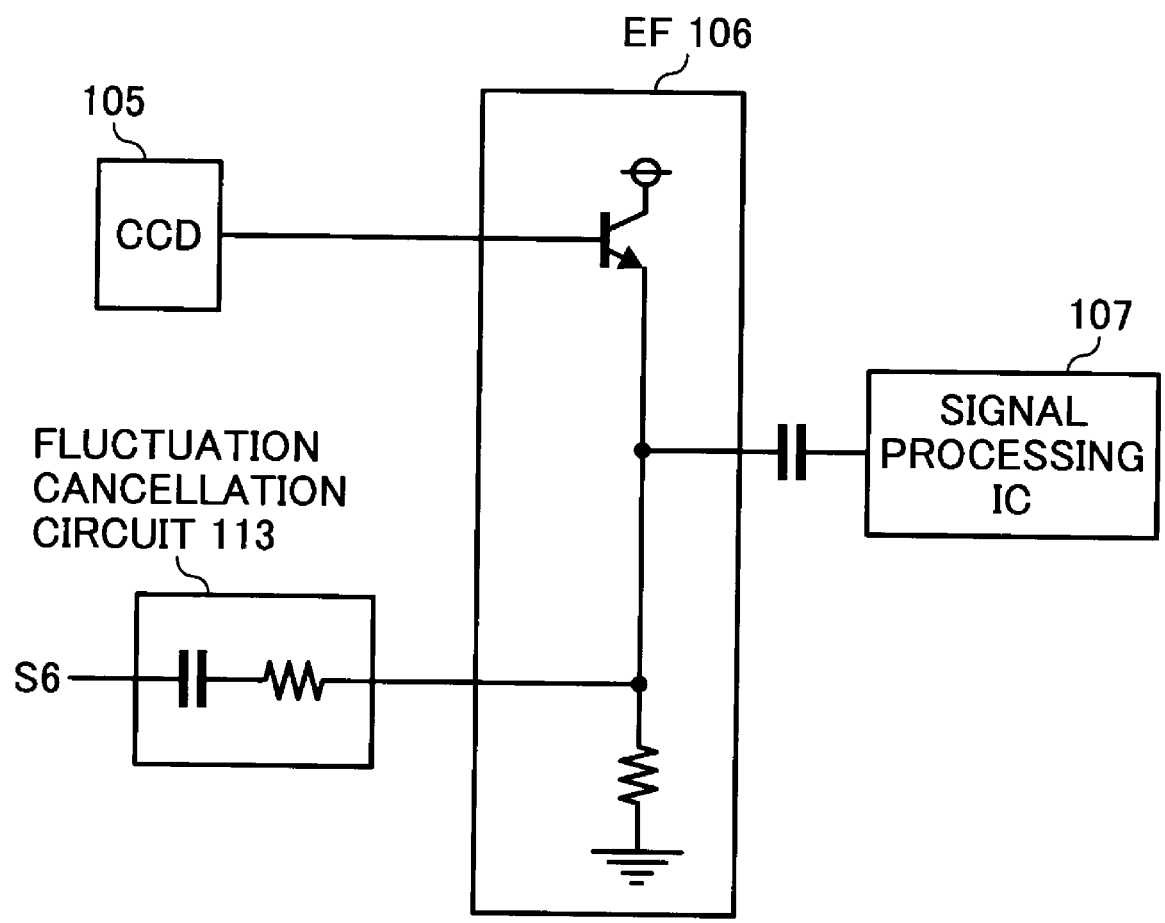
FIG. 8 is a block diagram illustrating an example circuit configuration for signal processing according to a third embodiment of the present invention.

FIG. 8 is a block diagram illustrating an example circuit configuration for signal processing according to a third embodiment of the present invention. In the third embodiment, the output signal of the CCD passes through a buffer, an amplification circuit, or an attenuation circuit that has a finite output resistance. A load current of the buffer, the amplification circuit, or the attenuation circuit fluctuates by an amount corresponding to the fluctuation in the clock frequency.

In FIG. 8, the output signal of the CCD 105 passes through the emitter follower (EF) circuit 106 serving as a buffer, is AC coupled to eliminate a DC component therefrom, and is processed and converted into digital data by the signal processing IC 107. In a fluctuation cancellation circuit 113, the modulated signal S6, which is an analog signal corresponding to the fluctuation in the clock frequency, is AC coupled to eliminate a DC component therefrom. The output of the fluctuation cancellation circuit 113 is input to the emitter follower circuit 106. Accordingly, a bias current of the emitter follower circuit 106 is changed to an anti-phase analog signal with the same amount of fluctuation as that of the image signal so that the fluctuation component in the analog image signal is cancelled. As the buffer, an amplification circuit or an attenuation circuit may be used as a substitute for the emitter follower circuit.

According to the third embodiment, when the analog image signal is overlapped to the anti-phase analog signal with the same amount of fluctuation as that of the image signal, the load current of the circuit for receiving the output signal of the CCD fluctuates by the same amount as the fluctuation amount of the image signal. Therefore, the fluctuation component in the image signal is cancelled.

Figure 9:
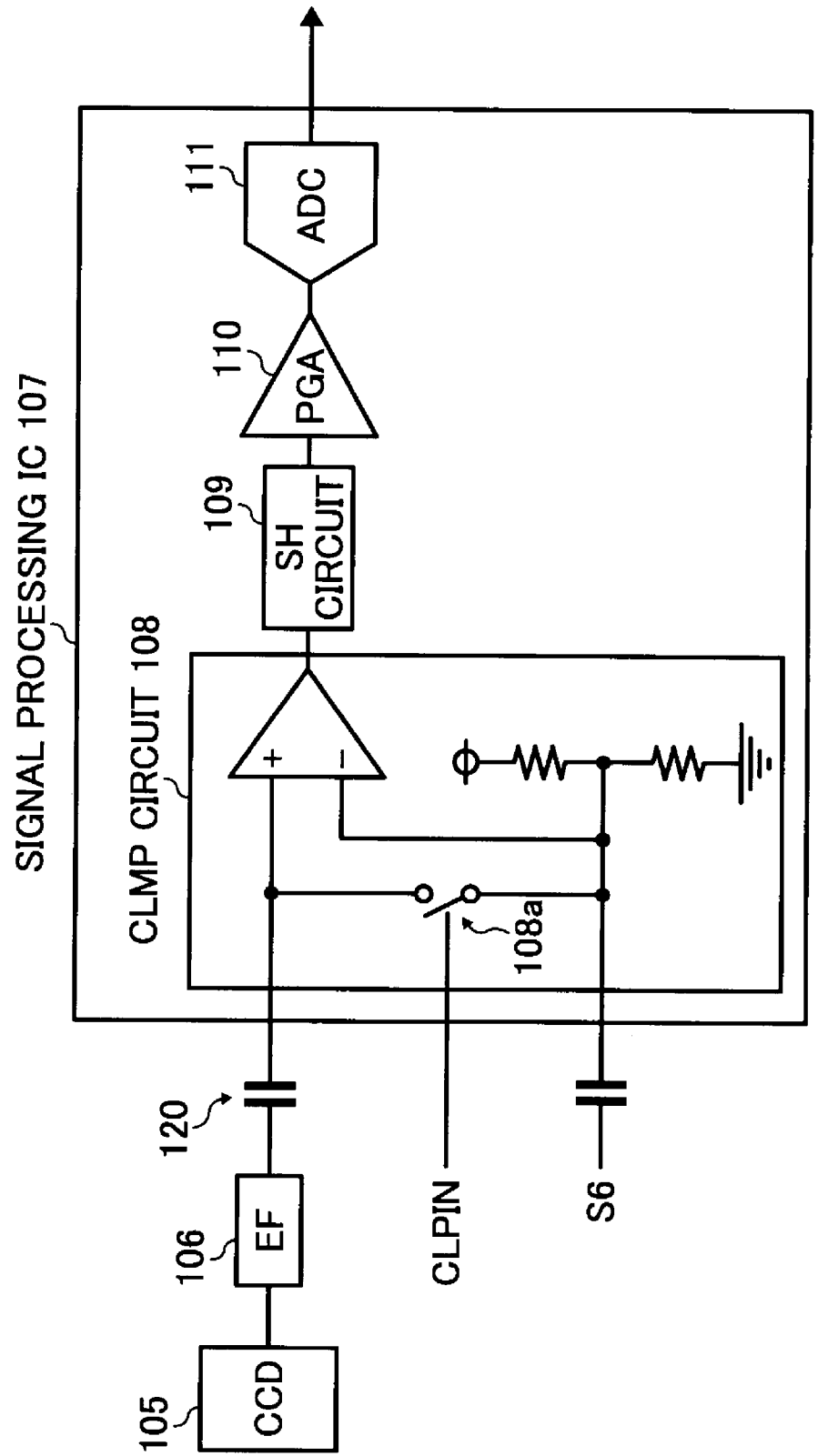
FIG. 9 is a block diagram illustrating an example circuit configuration for signal processing according to a fourth embodiment of the present invention.

FIG. 9 is a block diagram illustrating an example circuit configuration for signal processing according to a fourth embodiment of the present invention. In the fourth embodiment, the clamping circuit included in the image reading apparatus clamps the analog image signal at a reference potential of the clamping circuit. Specifically, the CCD converts incident light into an analog image signal. The analog image signal is AC coupled and then clamped at the reference potential by the clamping circuit. The reference potential fluctuates by an amount corresponding to the fluctuation in the clock frequency.

In FIG. 9, the output signal of the CCD 105 passes through the emitter follower (EF) circuit 106 serving as a buffer, is AC coupled at a capacitor 120 to eliminate a DC component therefrom, and is input to the signal processing IC 107. In the signal processing IC 107, the AC coupled analog image signal is clamped at an internal reference potential of the signal processing IC 107 by the clamping circuit 108, which outputs the difference between the analog image signal and the internal reference potential. The sample-hold circuit 109 samples the signal by using a sample pulse, which is one of the signal processing IC drive signals, and maintains the level of the signal to produce a continuous analog image signal. This continuous analog image signal is amplified by the programmable gain amplifier (PGA) 110 and converted into digital data by the AD converter 111.

Figure 10:
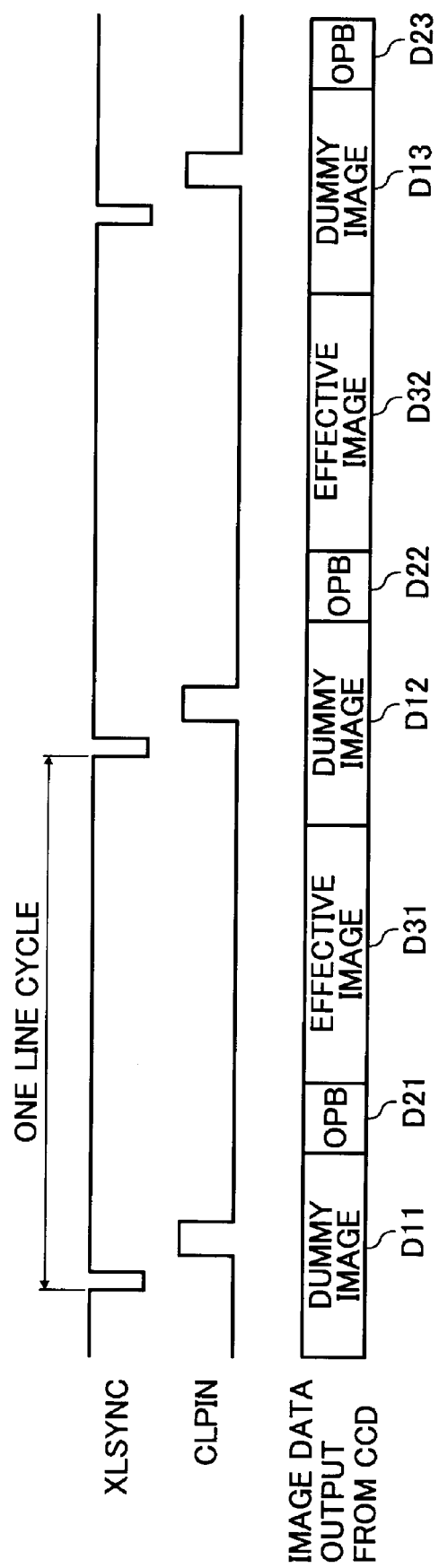
FIG. 10 is a diagram for illustrating a CLPIN signal input to a clamping circuit.

FIG. 10 is a diagram for illustrating a CLPIN signal input to the clamping circuit 108. In FIG. 10, XLSYNC is a periodic signal for one line. When the XLSYNC is changed to low, the CCD 105 outputs image data in order of a dummy image D11, an optical black image (OPB) D21, an effective image D31, a dummy image D12, an OPB D22, an effective image D32, a dummy image D13, an OPB D23, and so on. The dummy image and the OPB are both image data at the black level of the CCD 105. During the period when the image data output from the CCD 105 is at the black level, the CLPIN signal is changed to high, which corresponds to turning on a clamping switch 108a in the clamping circuit 108 of FIG. 9. In this configuration, the average value of the potential during the period when the clamping switch 108a is turned on in the black level period of the analog image signal is determined as the reference potential of the signal processing IC 107.

When the CLPIN signal is low, the clamping switch 108*a* is off. The modulated signal S6, which is an analog signal corresponding to the fluctuation in the clock frequency, is AC coupled to eliminate a DC component therefrom and overlapped to the reference potential of the clamping circuit 108. Accordingly, the reference potential is changed to an anti-phase analog signal with the same amount of fluctuation as that of the image signal.

By overlapping the analog image signal to the reference voltage of the clamping circuit 108, which is the anti-phase analog signal with the same amount of fluctuation as that of the image signal, and taking the difference between the analog image signal and the reference potential, the fluctuation component in the analog image signal is cancelled as described with reference to the first embodiment.

According to the fourth embodiment, when the analog image signal is overlapped to the anti-phase analog signal with the same amount of fluctuation as that of the image signal, the reference potential of the clamping circuit fluctuates by an amount corresponding to the fluctuation in the clock frequency and the difference between the analog image signal from the CCD and the reference potential is taken to change the reference potential to the anti-phase analog signal with the same amount of fluctuation as that of the image signal in the following stage. Therefore, the fluctuation component in the image signal is cancelled.

Figure 11:
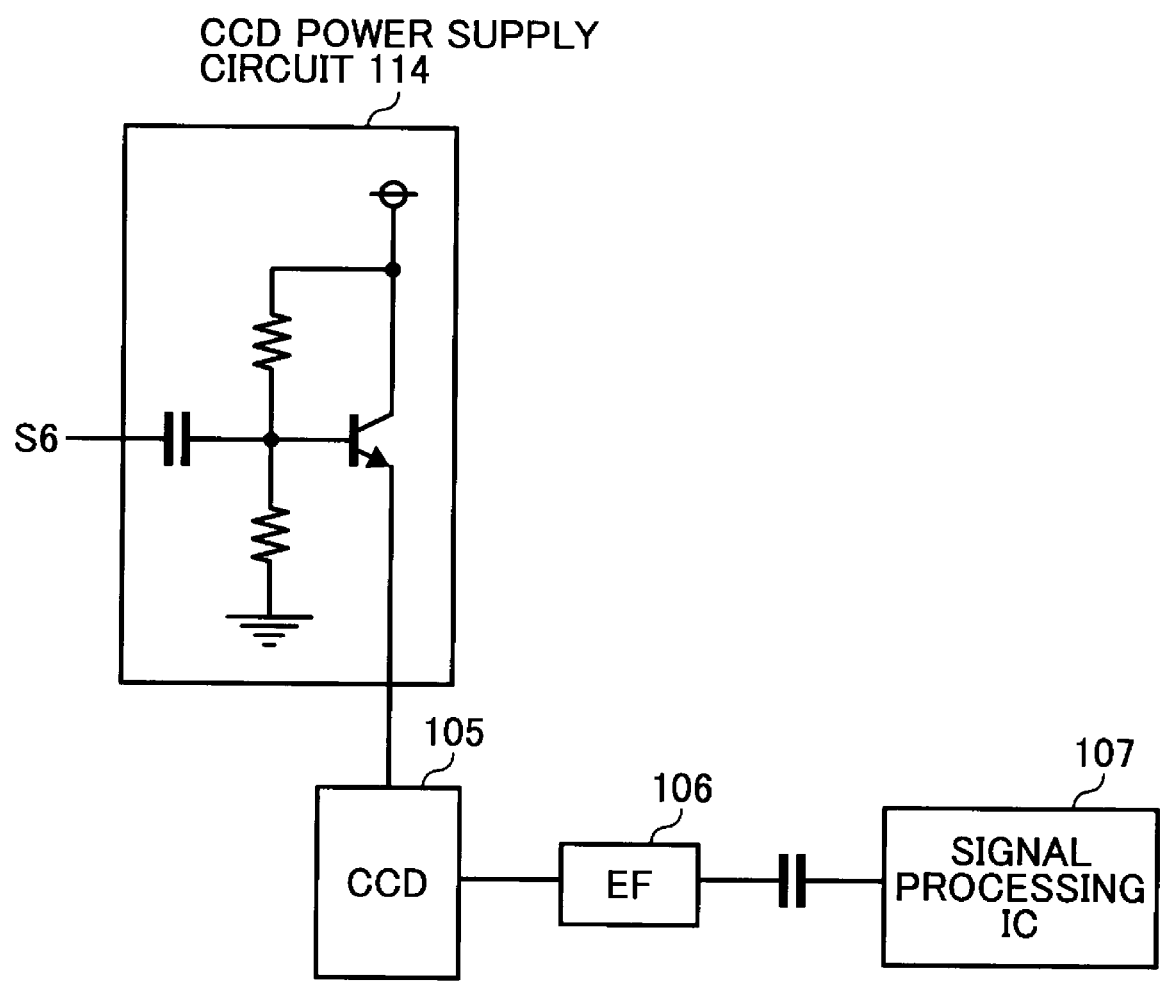
FIG. 11 is a block diagram illustrating an example circuit configuration for signal processing according to a fifth embodiment of the present invention.

FIG. 11 is a block diagram illustrating an example circuit configuration for signal processing according to a fifth embodiment of the present invention. In the fifth embodiment, a power supply voltage of the CCD fluctuates by an amount corresponding to the fluctuation in the clock frequency.

In FIG. 11, the output signal of the CCD 105 passes through the emitter follower circuit 106 serving as a buffer, is AC coupled to eliminate a DC component therefrom, and is processed and converted into digital data by the signal processing IC 107. The output signal of the CCD 105 is affected by a power supply voltage of the CCD 105. In a CCD power supply circuit 114, the modulated signal S6, which is an analog signal corresponding to the fluctuation in the clock frequency, is AC coupled to eliminate a DC component therefrom, overlapped to a bias voltage, and input to an emitter follower circuit of the CCD power supply circuit 114. Accordingly, the power supply voltage of the CCD 105 is changed to an anti-phase analog signal with the same amount of fluctuation as that of the image signal. Therefore, the fluctuation component in the analog image signal is cancelled.

According to the fifth embodiment, when the analog image signal is overlapped to the anti-phase analog signal with the same amount of fluctuation as that of the image signal, the power supply voltage of the CCD fluctuates by an amount corresponding to the fluctuation in the clock frequency. Therefore, the fluctuation component in the image signal is cancelled.

Figure 12:
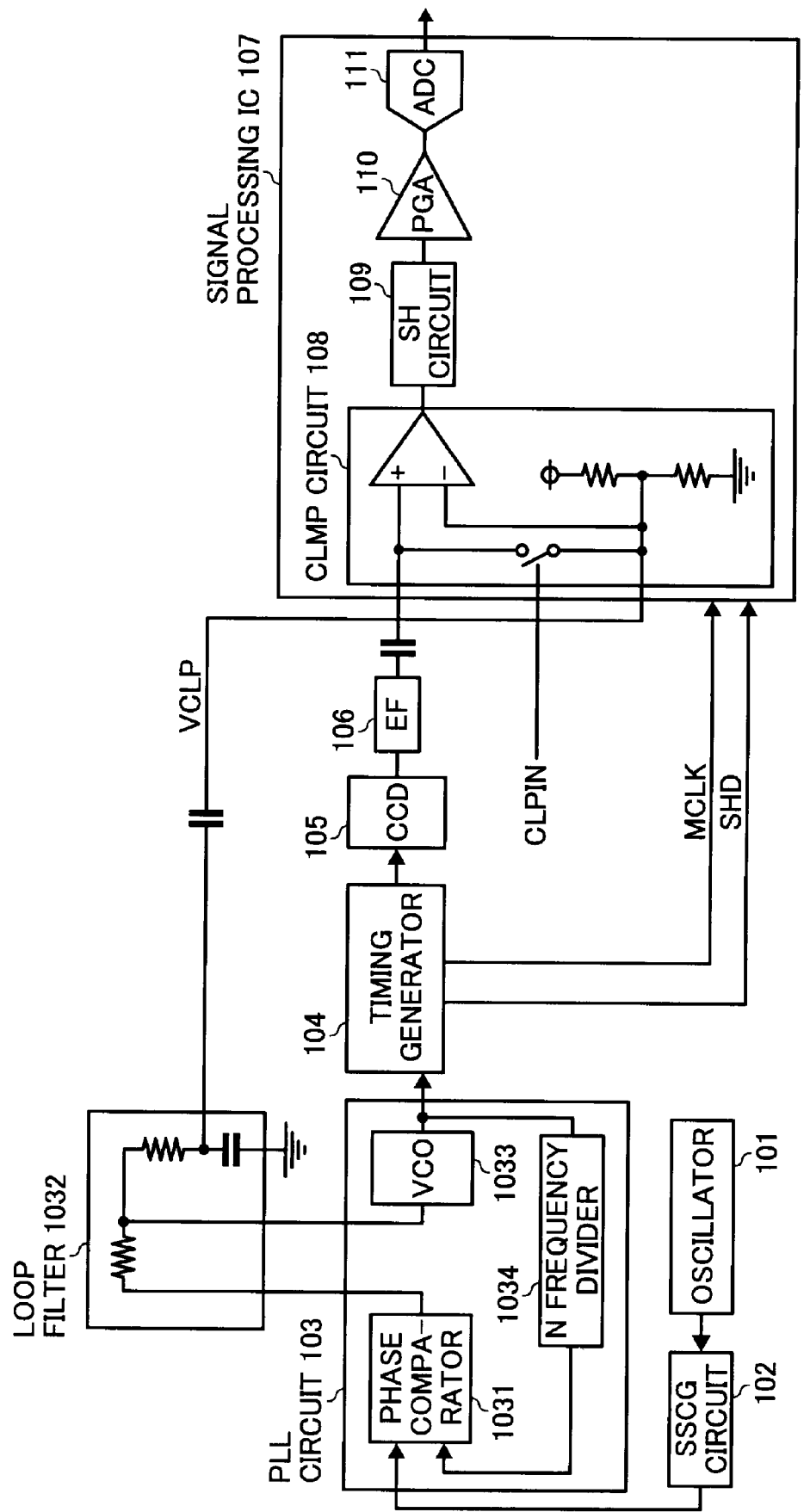
FIG. 12 is a block diagram illustrating an example circuit configuration for signal processing according to a sixth embodiment of the present invention.

FIG. 12 is a block diagram illustrating an example circuit configuration for signal processing according to a sixth embodiment of the present invention. In the sixth embodiment, the signal passing the PLL circuit is the frequency modulated reference clock signal of the timing generator and an analog signal corresponding to the fluctuation in the clock frequency is generated by the PLL circuit.

In FIG. 12, the PLL circuit 103 includes a phase comparator 1031, a loop filter 1032, a Voltage Controlled Oscillator (VCO) 1033, and an N frequency divider 1034. The signal processing IC 107 is the same as the signal processing IC 107 according to the fourth embodiment. Other components are the same as those described with reference to FIG. 1.

In this configuration, a clock signal from the oscillator 101 is frequency modulated by the SSCG circuit 102 and multiplied by the PLL circuit 103 to generate a CCD drive signal and a signal processing IC drive signal by the timing generator 104.

The PLL circuit 103 multiplies a frequency f of the clock signal from the SSCG circuit 102 by a frequency divider ratio of the N frequency divider 1034 of N, which is an integer. Specifically, the PLL circuit 103 outputs a frequency of N×f. The phase comparator 1031 outputs a phase difference between the signal input thereto and the output signal of the N frequency divider 1034 in the form of voltage or current.

The VCO 1033 provides a function of converting input voltage into frequency. The input voltage of the VCO 1033 is an analog signal corresponding to the fluctuation in the clock frequency.

From the signal multiplied by the PLL circuit 103, the timing generator 104 generates the CCD drive signal and the signal processing IC drive signal. The timing generator 104 outputs an MCLK, which is a system clock for the signal processing IC 107, and an SHD, which is a sample pulse for the sample-hold circuit 109.

The frequency modulated clock signal from the timing generator 104 drives the CCD 105, which is a photoelectric converter that converts light reflected from an original into an electrical signal. The CCD 105 outputs an analog image signal to the signal processing IC 107 via the emitter follower circuit 106. The signal processing IC 107 includes the clamping circuit 108, the sample-hold circuit 109, the programmable gain amplifier 110, and the AD converter 111 as described with reference to the fourth embodiment. After the analog image signal is AC coupled, the clamping circuit 108 clamps the analog image signal at the internal reference potential of the signal processing IC 107. The sample-hold circuit 109 samples the analog image signal by using a sample pulse, which is one of the signal processing IC drive signals, and maintains the level of the analog image signal to produce a continuous analog image signal. This continuous analog image signal is amplified by the programmable gain amplifier 110 and converted into digital data by the AD converter 111.

An analog signal from the loop filter 1032 is AC coupled to eliminate a DC component therefrom, which is referred to as a signal VCLP. The signal VCLP is overlapped to the reference potential of the clamping circuit 108 so that the reference potential is changed to an anti-phase analog signal with the same amount of fluctuation as that of the image signal. By taking the difference between the analog image signal and the reference potential, the fluctuation component in the analog image signal is cancelled, as described with reference to the first embodiment.

According to the sixth embodiment, the analog signal corresponding to the fluctuation in the clock frequency is generated from the analog signal between the phase comparator and the VCO in the PLL circuit, and the analog image signal is overlapped to the anti-phase analog signal synchronized with the clock modulation cycle. Therefore, the fluctuation component in the image signal is cancelled.

Figure 13:
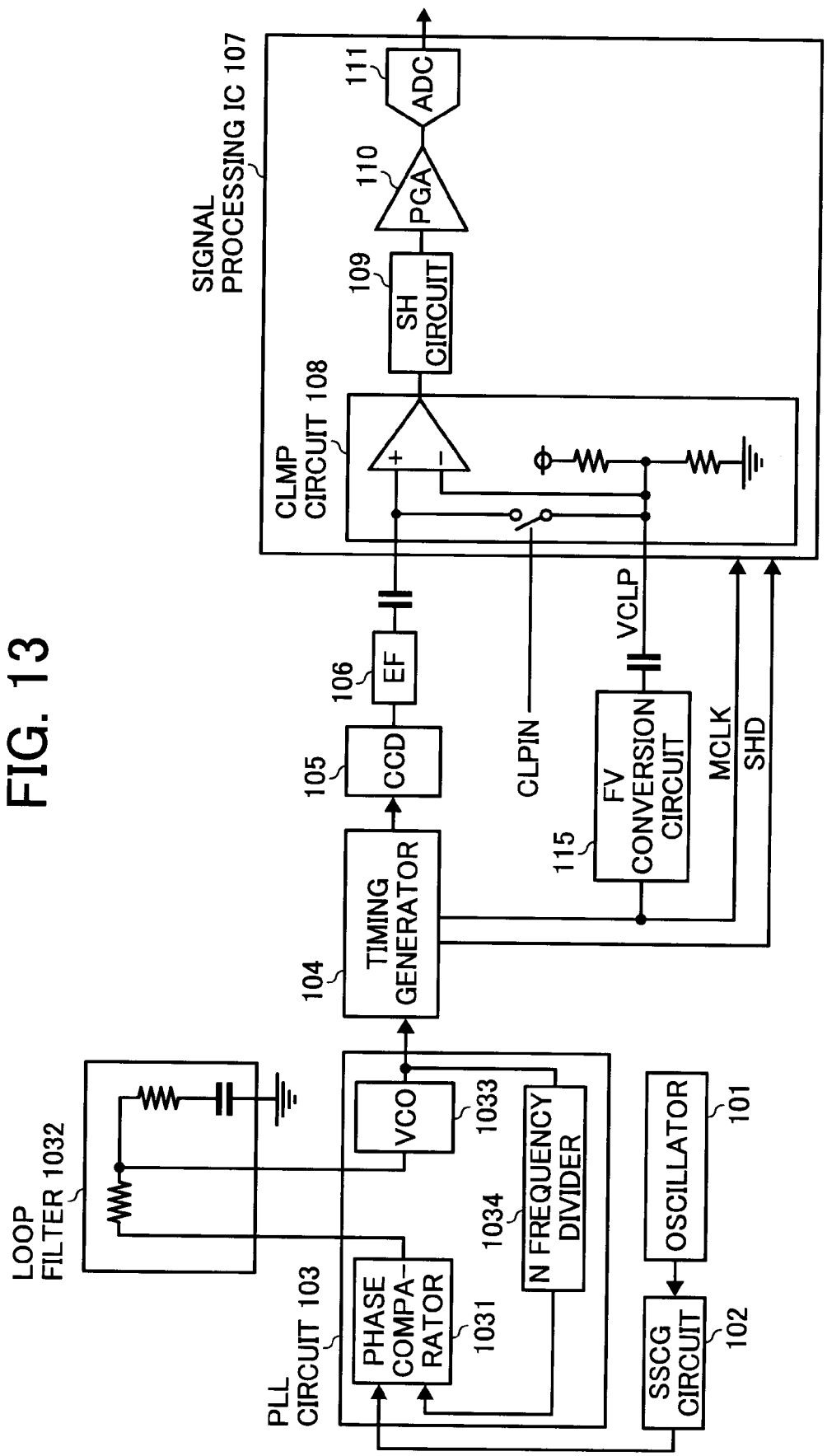
FIG. 13 is a block diagram illustrating an example circuit configuration for signal processing according to a seventh embodiment of the present invention.

FIG. 13 is a block diagram illustrating an example circuit configuration for signal processing according to a seventh embodiment of the present invention. In the seventh embodiment, the timing generator generates a clock signal from a frequency modulated reference clock signal of the timing generator and the analog signal corresponding to the fluctuation in the clock frequency is generated from the clock signal by passing the clock signal through an FV conversion circuit.

In the seventh embodiment, the analog signal corresponding to the fluctuation in the clock frequency is obtained from the timing generator 104 via a different circuit from that of the signal processing circuit according to the sixth embodiment. Specifically, the system clock MCLK from the timing generator 104 is input to the signal processing IC 107 and to an FV conversion circuit 115 at the same time. The FV conversion circuit 115 generates the analog signal corresponding to the fluctuation in the clock frequency from the system clock MCLK, which is frequency modulated. The analog signal is AC coupled to eliminate a DC component therefrom, which is referred to as a signal VCLP. The signal VCLP is overlapped to the reference potential of the clamping circuit 108 so that the reference potential is changed to an anti-phase analog signal with the same amount of fluctuation as that of the image signal. Then, by taking the difference between the analog image signal and the reference potential, the fluctuation component in the analog image signal is cancelled as described with reference to the first embodiment.

Figure 14:
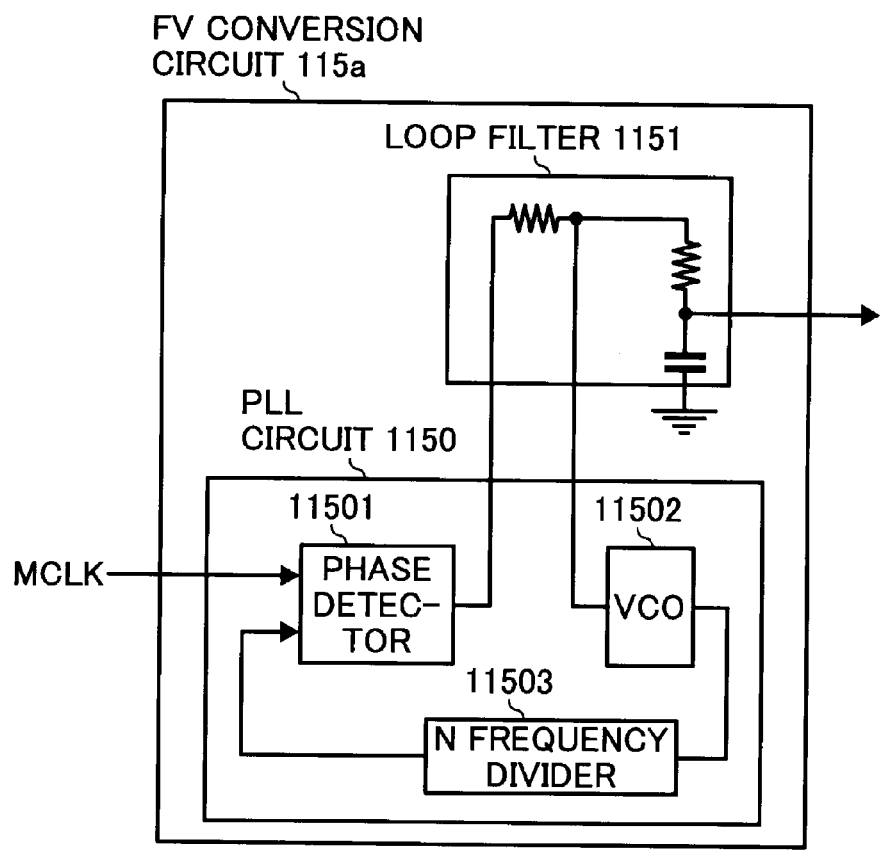
FIG. 14 is a block diagram illustrating an FV conversion circuit using a PLL circuit.

FIG. 14 is a block diagram illustrating an FV conversion circuit 115a using a PLL circuit. The FV conversion circuit 115a includes a PLL circuit 1150 and a loop filter 1151. The PLL circuit 1150 includes a phase detector 11501, a VCO 11502, and an N frequency divider 11503. The PLL circuit 1150 is the same as the PLL circuit 103 in the sixth embodiment illustrated in FIG. 12 and performs the same operation. In this example, the system clock MCLK is input to the phase detector 11501 and the analog signal corresponding to the fluctuation in the frequency is obtained from the loop filter 1151.

Figure 15:
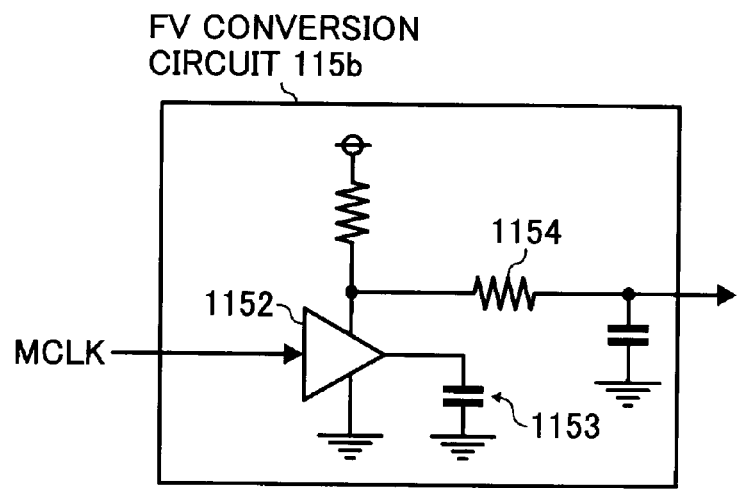
FIG. 15 is a block diagram illustrating an FV conversion circuit using a charge/discharge circuit of a capacitor.

FIG. 15 is a block diagram illustrating an FV conversion circuit 115b using a charge/discharge circuit of a capacitor. In this example, the FV conversion circuit 115b includes a drive circuit of a capacitor. When the frequency modulated system clock MCLK is input to an amplifier 1152, a capacitor 1153 stores charge when the system clock MCLK is high and discharges the charge when the system clock MCLK is low. Since a power supply current is different when charging the capacitor 1153 and when discharging the capacitor 1153, voltage drop across a resistor in the power supply is also different. A smoothing circuit 1154 smoothes the output obtained by charging and discharging, and an analog signal corresponding to the fluctuation in the frequency is obtained.

Figure 16:
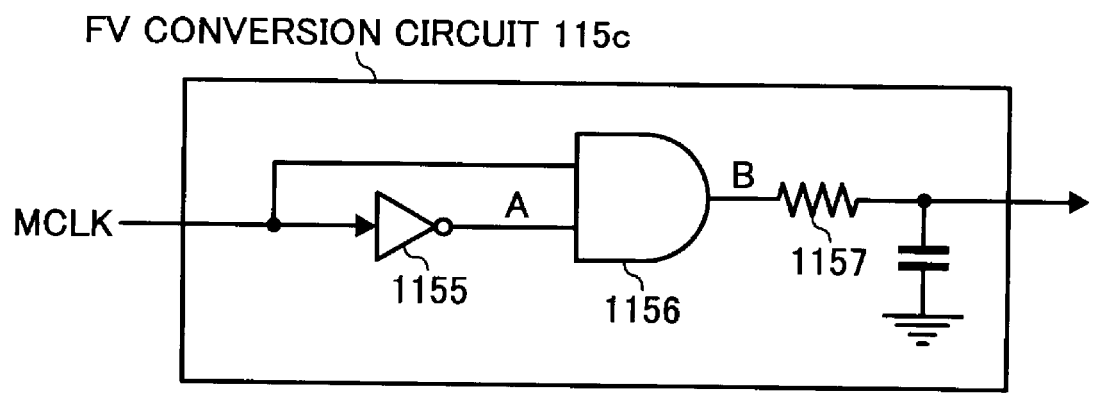
FIG. 16 is a block diagram illustrating an FV conversion circuit that converts fluctuation in frequency into change in a pulse duty cycle and smoothes the change.

FIG. 16 is a block diagram illustrating an FV conversion circuit 115c that converts fluctuation in the frequency into change in a pulse duty cycle and smoothes the change. In this example, the FV conversion circuit 115c includes an inverter circuit 1155, an AND circuit 1156, and a smoothing circuit 1157. The system clock MCLK input to the FV conversion circuit 115c is inverted and delayed by the inverter circuit 1155, and input to the AND circuit 1156. Since the delay by the inverter circuit 1155 is constant, the fluctuation in the frequency is converted into the change in a duty cycle of the output signal B of the AND circuit 1156 before the output signal B enters the smoothing circuit 1157. The smoothing circuit 1157 smoothes the signal B, and therefore an analog signal corresponding to the fluctuation in the frequency is obtained.

Figure 17:
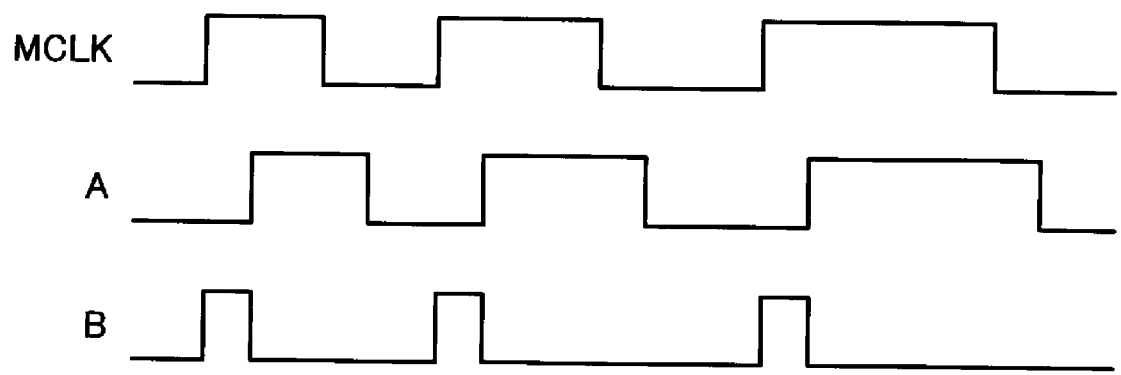
FIG. 17 is a timing chart illustrating a relation between an output signal of an inverter circuit, an output signal of an AND circuit, and a system clock according to the seventh embodiment of the present invention.

FIG. 17 is a timing chart illustrating the relation between the output signal A of the inverter circuit 1155, the output signal B of the AND circuit 1156, and the system clock MCLK. As can be seen in the timing chart, the signal B rises when the system clock MCLK rises and falls when the signal A rises.

According to the seventh embodiment, the continuous clock signal from the timing generator is converted into the analog signal, and the analog image signal is overlapped to the anti-phase analog signal synchronized with the clock modulation cycle. Therefore, the fluctuation component in the image signal is cancelled.

According to the seventh embodiment, the PLL circuit converts the continuous clock signal from the timing generator into the analog signal, and the analog image signal is overlapped to the anti-phase analog signal synchronized with the clock modulation cycle. Therefore, the fluctuation component in the image signal is cancelled.

According to the seventh embodiment, the charge/discharge circuit of the capacitor converts the continuous clock signal from the timing generator into the analog signal, and the analog image signal is overlapped to the anti-phase analog signal synchronized with the clock modulation cycle. Therefore, the fluctuation component in the image signal is cancelled.

According to the seventh embodiment, the circuit that converts the fluctuation in the frequency into the change in the pulse duty cycle and smoothes the change converts the continuous clock signal from the timing generator into the analog signal, and the analog image signal is overlapped to the anti-phase analog signal synchronized with the clock modulation cycle. Therefore, the fluctuation component in the image signal is cancelled.

Figure 18:
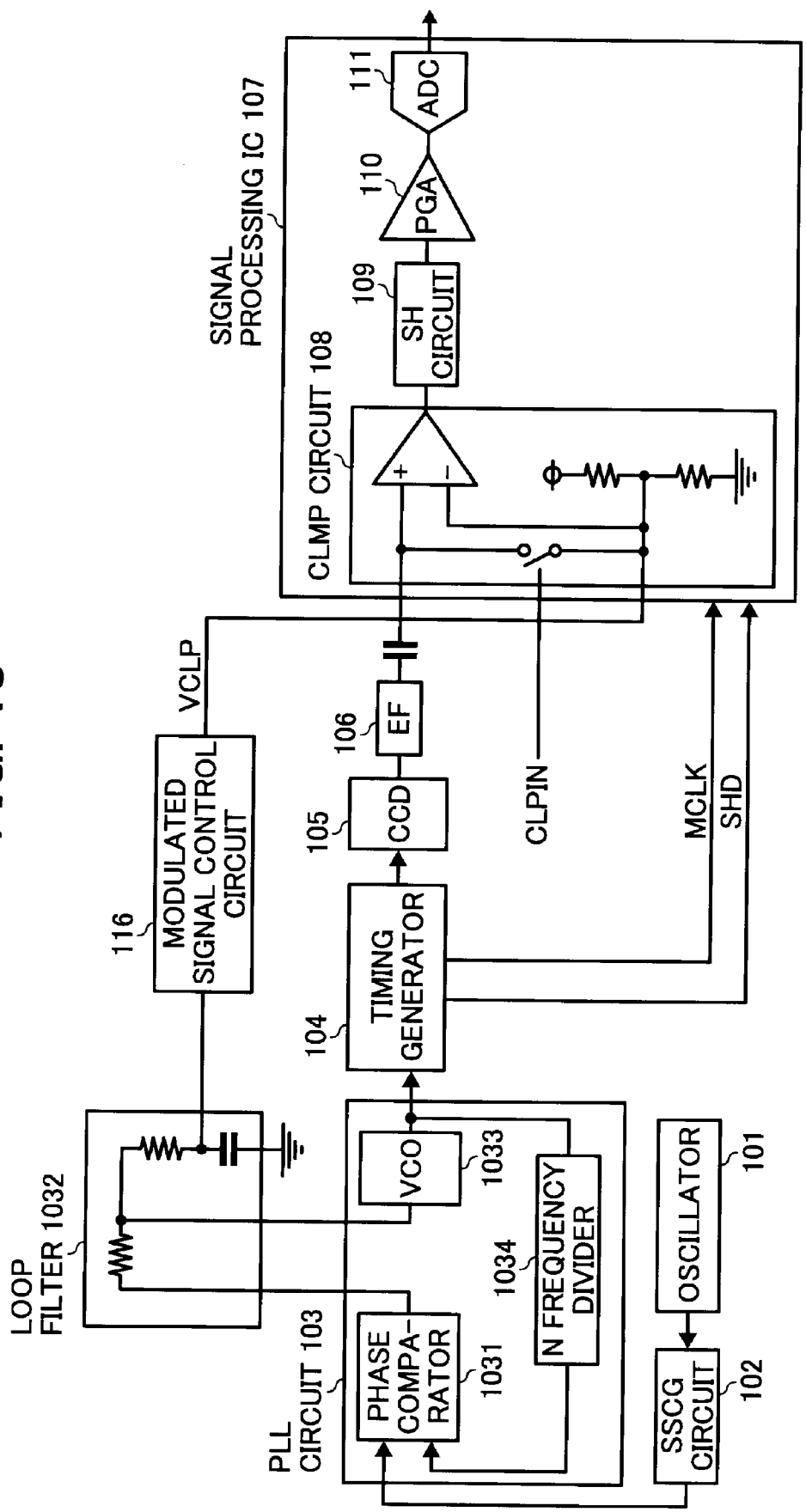
FIG. 18 is a block diagram illustrating an example circuit configuration for signal processing according to an eighth embodiment of the present invention.

FIG. 18 is a block diagram illustrating an example circuit configuration for signal processing according to an eighth embodiment of the present invention. In the eighth embodiment, the analog signal corresponding to the fluctuation in the clock frequency is amplified or attenuated.

The configuration according to the eighth embodiment is the same as that according to the sixth embodiment illustrated in FIG. 12, except that a modulated signal control circuit 116 is provided on the output line of the signal VCLP from the loop filter 1032.

Figure 19:
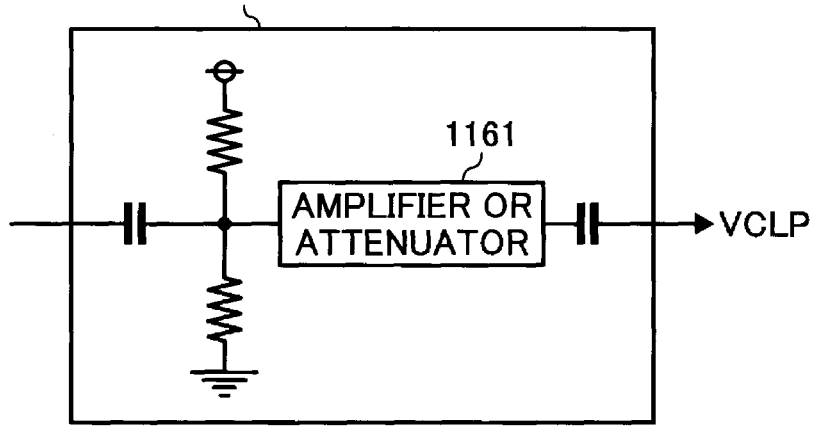
FIG. 19 is a block diagram illustrating a modulated signal control circuit of FIG. 18.

FIG. 19 is a block diagram illustrating an example modulated signal control circuit. In the modulated signal control circuit 116a, the modulated signal, which is an analog signal corresponding to the fluctuation in the clock frequency, is AC coupled to eliminate a DC component therefrom, overlapped to a bias voltage, and amplified or attenuated by an amplifier or an attenuator 1161. Thereafter, the signal is AC coupled to eliminate a DC component therefrom and output as a signal VCLP. By overlapping the signal VCLP to the reference potential of the clamping circuit 108, the reference potential is changed to an anti-phase analog signal with the same amount of fluctuation as that of the image signal.

According to the eighth embodiment, the analog signal corresponding to the fluctuation in the clock frequency is amplified or attenuated by the amplifier or the attenuator and the fluctuation amount of the anti-phase analog signal synchronized with the clock modulation cycle is controlled to be overlapped to the analog image signal. Therefore, the capability of canceling the fluctuation is improved.

Figure 20:
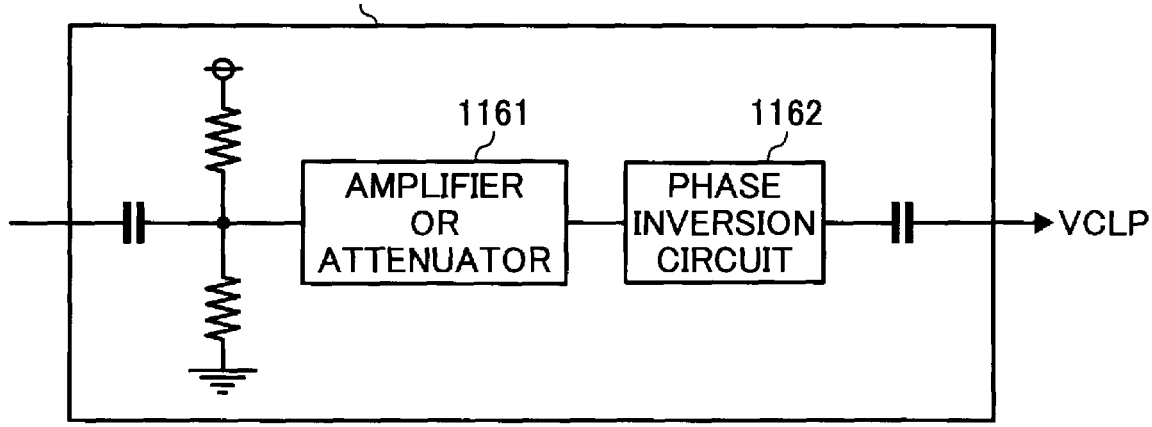
FIG. 20 is a block diagram illustrating a modulated signal control circuit according to a ninth embodiment of the present invention.

FIG. 20 is a block diagram illustrating a modulated signal control circuit 116b according to a ninth embodiment of the present invention. In the ninth embodiment, the phase of the analog signal corresponding to the fluctuation in the clock frequency is inverted.

The configuration of the signal processing circuit according to the ninth embodiment is the same as that according to the sixth embodiment illustrated in FIG. 12, except that the modulated signal control circuit 116b is provided on the output line of the signal VCLP from the loop filter 1032.

In this example, the modulated signal, which is an analog signal corresponding to the fluctuation in the clock frequency, is AC coupled to eliminate a DC component therefrom, overlapped to a bias voltage, and amplified or attenuated by the amplifier or the attenuator 1161. Thereafter, the phase of the signal is inverted by a phase inversion circuit 1162 and the signal is AC coupled to eliminate a DC component therefrom and output as a signal VCLP. By overlapping the signal VCLP to the reference potential of the clamping circuit 108, the reference potential is changed to an anti-phase analog signal with the same amount of fluctuation as that of the image signal.

According to the ninth embodiment, when the direction of the fluctuation in the image signal caused by the fluctuation in the clock frequency is changed, the phase of the analog signal corresponding to the fluctuation in the clock frequency is inverted. Therefore, the fluctuation component in the image signal is cancelled.

Figure 21:
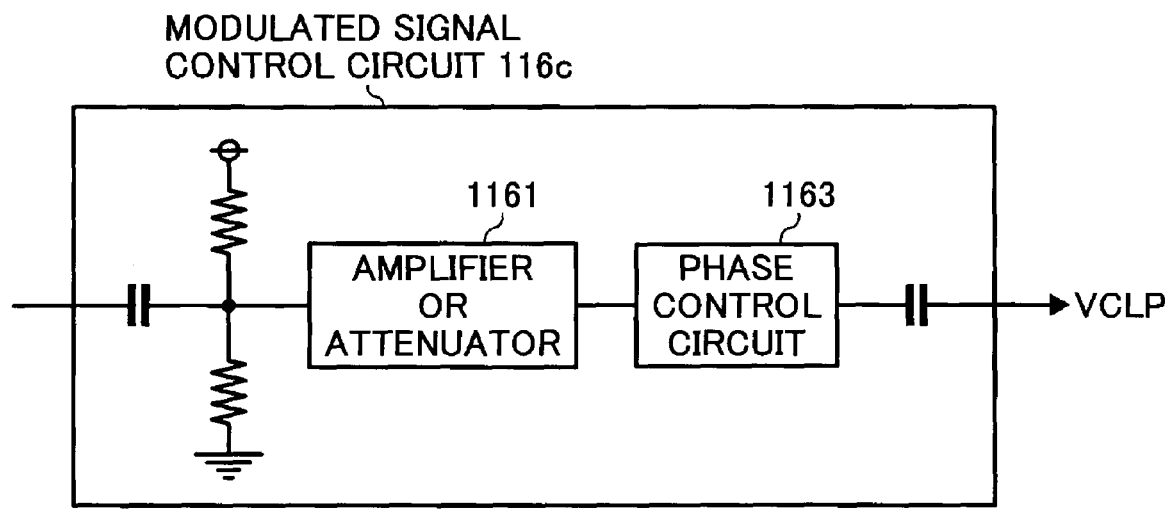
FIG. 21 is a block diagram illustrating a modulated signal control circuit according to a tenth embodiment of the present invention.

FIG. 21 is a block diagram illustrating a modulated signal control circuit 116c according to a tenth embodiment of the present invention. In the tenth embodiment, the phase of the analog signal corresponding to the fluctuation in the clock frequency is arbitrarily controlled to overlap the anti-phase analog signal to the analog image signal.

In the tenth embodiment, the modulated signal, which is an analog signal corresponding to the fluctuation in the clock frequency, is AC coupled to eliminate a DC component therefrom, overlapped to a bias voltage, and amplified or attenuated by the amplifier or the attenuator 1161. Thereafter, the phase of the signal is arbitrarily converted by a phase control circuit 1163 and the signal is AC coupled to eliminate a DC component therefrom and output as a signal VCLP. By overlapping the signal VCLP to the reference potential of the clamping circuit 108, the reference potential is changed to an anti-phase analog signal with the same amount of fluctuation as that of the image signal.

Figure 22:
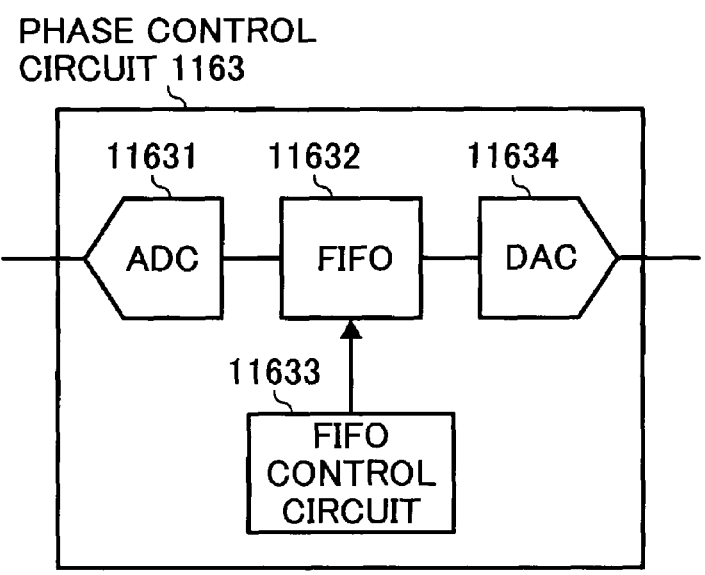
FIG. 22 is a block diagram illustrating internal circuitry of a phase control circuit of FIG. 21.

FIG. 22 is a block diagram illustrating internal circuitry of the phase control circuit 1163 of FIG. 21. In the tenth embodiment, the phase control circuit 1163 includes an ADC 11631, a FIFO 11632, a FIFO control circuit 11633, and a DAC 11634. In this configuration, the analog signal is converted into a digital signal by the ADC 11631 and stored in the FIFO 11632. After the signal is delayed for a specified number of clocks by instruction from the FIFO control circuit 11633 to the FIFO 11632, the signal is converted into an analog signal by the DAC 11634. The FIFO control circuit 11633 controls the number of clocks for delaying the signal, and therefore it is possible to perform phase control.

According to the tenth embodiment, the phase of the analog signal corresponding to the fluctuation in the clock frequency is arbitrarily controlled and the image signal is overlapped to the anti-phase analog signal synchronized with the clock modulation cycle. Therefore, the fluctuation component in the image signal is cancelled.

Figure 23:
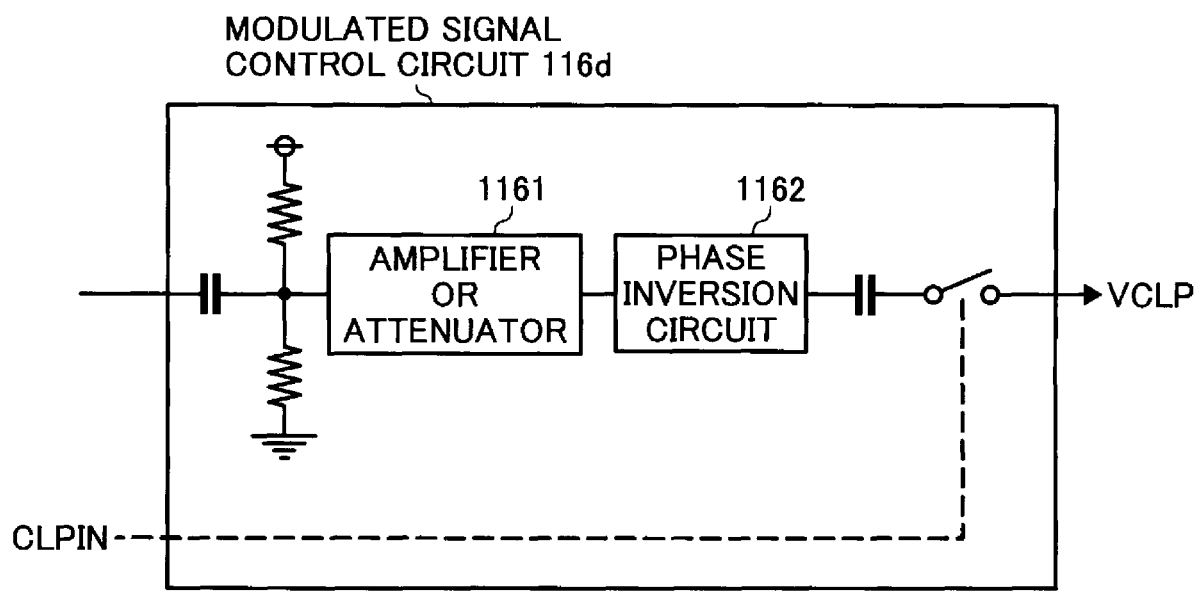
FIG. 23 is a block diagram illustrating a modulated signal control circuit according to an eleventh embodiment of the present invention.

FIG. 23 is a block diagram illustrating a modulated signal control circuit 116d according to an eleventh embodiment of the present invention. In the eleventh embodiment, the AC coupling capacitor in the output stage of the photoelectric converter is connected to a fixed potential while the AC coupling capacitor is charged and the analog signal corresponding to the fluctuation in the clock frequency is overlapped to the fixed potential except during charging of the AC coupling capacitor.

In the internal circuitry of the modulated signal control circuit 116d illustrated in FIG. 23, the modulated signal, which is an analog signal corresponding to the fluctuation in the clock frequency, is AC coupled to eliminate a DC component therefrom, overlapped to a bias voltage, and amplified or attenuated by the amplifier or the attenuator 1161. Thereafter, the phase of the signal is inverted by the phase inversion circuit 1162 and the signal is AC coupled to eliminate a DC component therefrom by an AC coupling capacitor and output as a signal VCLP.

A switch is placed after the AC coupling capacitor. When the signal CLPIN is high, the switch is turned off. When the signal CLPIN is low, the switch is turned on. Accordingly, it is possible to connect the AC coupling capacitor for the analog image signal to the internal reference potential of the signal processing IC 107 while the AC coupling capacitor is charged.

According to the eleventh embodiment, the reference potential of the clamping circuit is fixed while the AC coupling capacitor is charged and the analog signal that fluctuates corresponding to the fluctuation in the clock frequency is overlapped to the fixed reference potential except during the charging of the AC coupling capacitor. Therefore, the fluctuation component in the image signal is cancelled.

Figure 24:
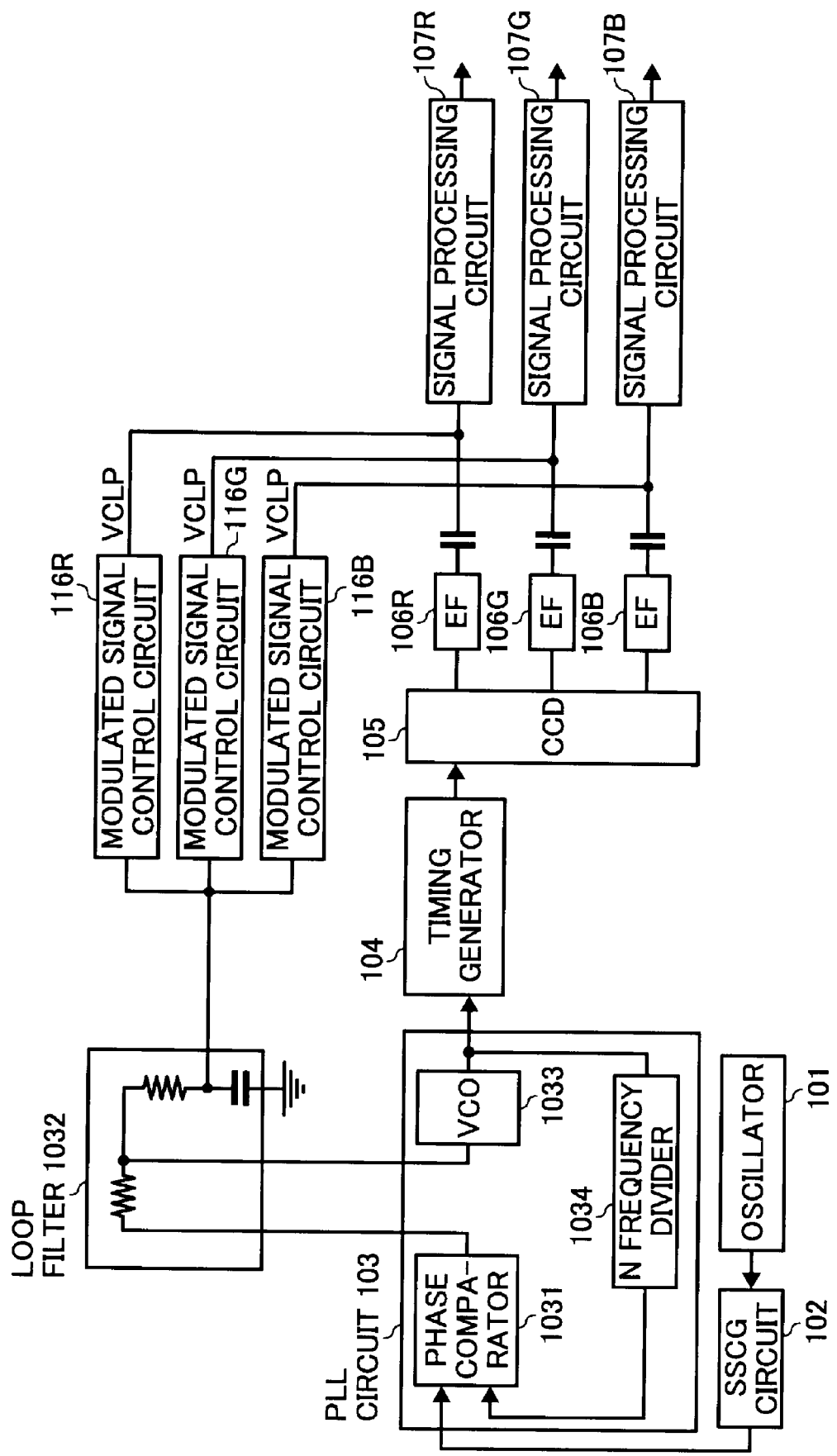
FIG. 24 is a block diagram illustrating an example circuit configuration for signal processing according to a twelfth embodiment of the present invention.

FIG. 24 is a block diagram illustrating an example circuit configuration for signal processing according to a twelfth embodiment of the present invention. In the twelfth embodiment, the photoelectric converter is a color sensor that converts incident light into electrical signals corresponding to three colors. Each analog image signal is overlapped to an analog signal corresponding to each clock frequency to individually control a voltage for each of the three colors or to individually control a phase for each of the three colors.

The twelfth embodiment deals with a difference in the fluctuation amount of the analog image signal among the three colors red, green, and blue, which are abbreviated as R, G, and B, respectively. The difference may arise when a color sensor is used as the photoelectric converter. The example circuit configuration illustrated in FIG. 24 is different from that according to the eighth embodiment illustrated in FIG. 18 in that three channels for RGB are included in an analog signal processing channel.

As can be seen in FIG. 24, the signal processing IC 107 and the modulated signal control circuit 116 include three channels for R, G, and B: signal processing circuits 107R, 107G, and 107B, and modulated signal control circuits 116R, 116G, and 116B, respectively. Therefore, it is possible to individually control the fluctuation amount or the phase of each analog signal corresponding to the fluctuation in the clock frequency. In controlling the fluctuation amount or the phase, the above-described ninth, tenth, and eleventh embodiments are adopted.

According to the twelfth embodiment, by individually controlling the fluctuation amount or the phase for the colors red, green, and blue, the effect of canceling the fluctuation component is improved.

Figure 25:
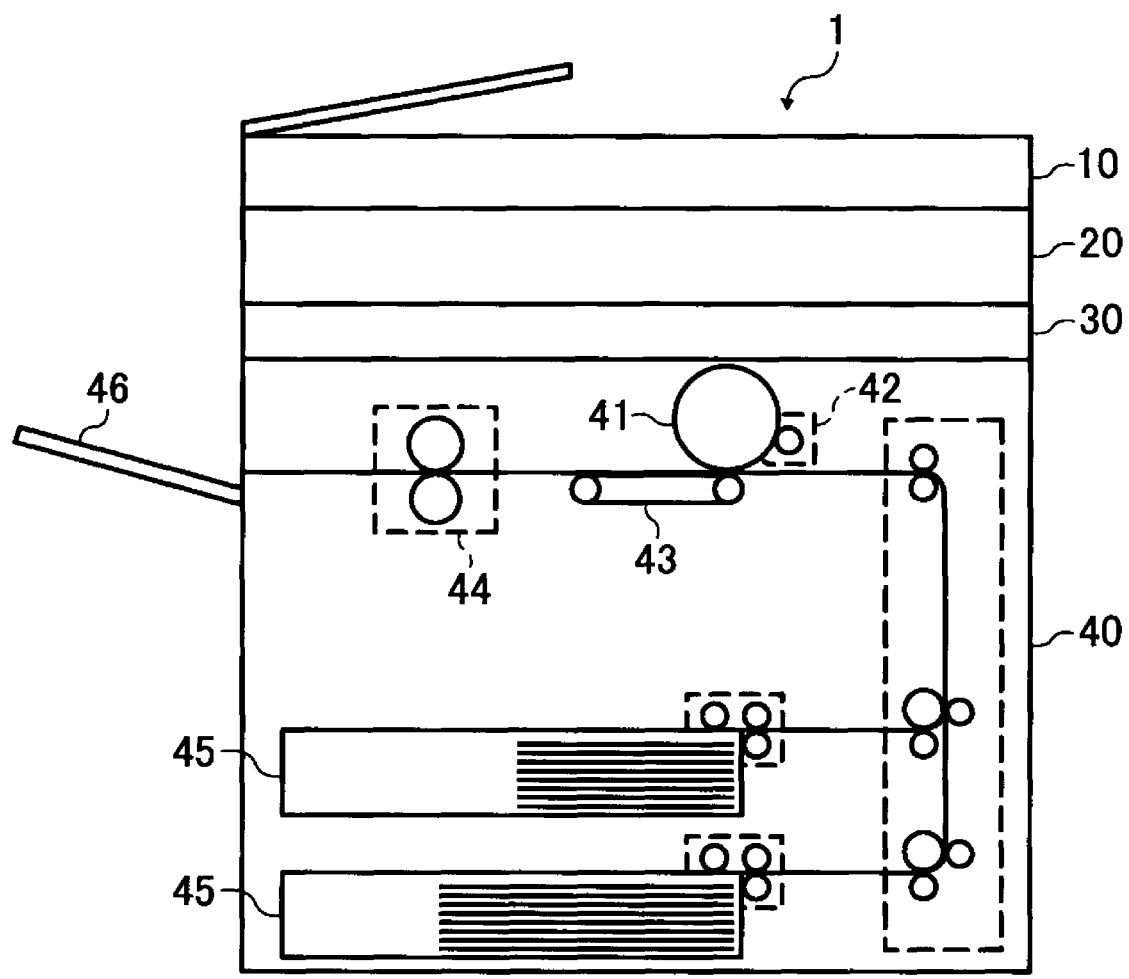
FIG. 25 is a cross-sectional diagram illustrating a schematic configuration of an image forming apparatus according to a thirteenth embodiment of the present invention.

FIG. 25 is a cross-sectional diagram illustrating a schematic configuration of an image forming apparatus 1 according to a thirteenth embodiment of the present invention. The image forming apparatus 1 is, for example, a digital composite machine having functions of copying, printing, facsimile transmission, etc. The image forming apparatus 1 includes the image reading apparatus according to any one of the above-described first through twelfth embodiments for image reading. The image forming apparatus 1 is provided with a control unit, not shown, that includes an application switch key for selecting and switching the functions of copying, printing, and facsimile transmission individually. When the copying function is selected, the image forming apparatus 1 operates in a copier mode. When the printing function is selected, the image forming apparatus 1 operates in a printer mode. When the facsimile transmission function is selected, the image forming apparatus 1 operates in a facsimile mode.

By way of example, an image forming operation in the copier mode is described with reference to FIG. 25. In the copier mode, an automatic document feeder (ADF) 10 feeds an original to an image reading device (scanner) 20. The image reading device 20 reads image information and a writing unit 30 converts the image information into optical information via an image processing unit, not shown. Based on the optical information from the writing unit 30, a photoconductive drum 41 that is included in a printer unit 40 and uniformly charged by a charger, not shown, is exposed to light to form a latent electrostatic image thereon. The latent electrostatic image on the photoconductive drum 41 is developed by a development device 42 and a toner image is formed. The toner image is transferred to a transfer sheet fed from a sheet cassette 45 by a conveyance belt 43 and fixed by a fixing device 44. The transfer sheet is output to a sheet output tray 46.

As can be understood by those of skill in the art, numerous additional modifications and variations are possible in light of the above teachings. It is therefore to be understood that, within the scope of the appended claims, the disclosure of this patent specification may be practiced otherwise than as specifically described herein.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program or computer program product. For example, the aforementioned methods may be embodied in the form of a system or device, including, but not limited to, any of the structures for performing the methodology illustrated in the drawings.

Example embodiments being thus described, it will be apparent that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image reading apparatus comprising:
    a photoelectric converter configured to convert incident light into an analog image signal;
    a drive unit configured to drive the photoelectric converter by a frequency modulated clock signal;
    an overlapping circuit configured to overlap an anti-phase analog signal to the analog image signal fluctuating according to the frequency modulated clock signal with a same amount of fluctuation as that of the analog image signal; and
    an analog digital converter configured to convert the overlapped analog image signal into a digital output.

2. The image reading apparatus according to claim 1, wherein the overlapping circuit comprises a level shift unit configured to shift a level of the analog image signal output from the photoelectric converter by an amount corresponding to the fluctuation in the clock frequency.

3. The image reading apparatus according to claim 1, wherein the overlapping circuit comprises a buffer having a finite output resistance and configured to receive the analog image signal output from the photoelectric converter, and a load current of the buffer is used as the anti-phase analog signal.

4. The image reading apparatus according to claim 1, wherein the overlapping circuit comprises:
    an AC coupling unit configured to AC couple the analog image signal; and
    a clamping unit configured to clamp a signal from the AC coupling unit at a reference potential,
    and the reference potential of the clamping unit is used as the anti-phase analog signal.

5. The image reading apparatus according to claim 4, wherein the AC coupling unit comprises an AC coupling capacitor connected to a fixed potential while the AC coupling capacitor is charged, and the anti-phase analog signal is overlapped to the analog image signal except during charging of the AC coupling capacitor.

6. The image reading apparatus according to claim 1, wherein a power supply voltage of the photoelectric converter is used as the anti-phase analog signal.

7. The image reading apparatus according to claim 1, wherein the overlapping circuit comprises a PLL circuit configured to receive the frequency modulated clock signal and generate an analog signal corresponding to the fluctuation in the clock frequency.

8. The image reading apparatus according to claim 1, wherein the overlapping circuit comprises:
    a timing generator configured to output a frequency modulated clock signal; and
    an FV conversion circuit configured to receive the frequency modulated clock signal from the timing generator and generate an analog signal corresponding to the fluctuation in the clock frequency.

9. The image reading apparatus according to claim 8, wherein the FV conversion circuit comprises a PLL circuit.

10. The image reading apparatus according to claim 8, wherein the FV conversion circuit comprises a charge/discharge circuit of a capacitor.

11. The image reading apparatus according to claim 8, wherein the FV conversion circuit converts the fluctuation in the clock frequency into change in a pulse duty cycle and smoothes the change.

12. The image reading apparatus according to claim 7, wherein the overlapping circuit further comprises a signal control circuit configured to amplify or attenuate the analog signal corresponding to the fluctuation in the clock frequency.

13. The image reading apparatus according to claim 7, wherein the overlapping circuit further comprises a signal control circuit configured to invert a phase of the analog signal corresponding to the fluctuation in the clock frequency.

14. The image reading apparatus according to claim 7, wherein the overlapping circuit further comprises a signal control circuit configured to arbitrarily control a phase of the analog signal corresponding to the fluctuation in the clock frequency.

15. The image reading apparatus according to claim 1, wherein the photoelectric converter comprises a color sensor that converts incident light into analog image signals corresponding to three colors and a voltage of the anti-phase analog signal is individually controlled for each analog image signal.

16. The image reading apparatus according to claim 1, wherein the photoelectric converter comprises a color sensor that converts incident light into analog image signals corresponding to three colors and a phase of the anti-phase analog signal is individually controlled for each analog image signal.

17. An image forming apparatus comprising the image reading apparatus according to claim 1.

* * * * *